United States Patent
McMurray et al.

[15] 3,674,279
[45] July 4, 1972

[54] CONSTANT PRESSURE SEAL

[72] Inventors: Mitchell McMurray, Peoria; Eugene A. Plouzek, Washington; James R. Sturges, Metamora, all of Ill.

[73] Assignee: Caterpillar Tractor Co., Peoria, Ill.

[22] Filed: Oct. 26, 1970

[21] Appl. No.: 84,179

Related U.S. Application Data

[63] Continuation of Ser. No. 738,519, June 20, 1968, abandoned.

[52] U.S. Cl..............................................277/95, 277/205
[51] Int. Cl............................................................F16j 15/34
[58] Field of Search.....................................277/95, 205, 206

[56] References Cited

UNITED STATES PATENTS

| | | | |
|---|---|---|---|
| 2,590,288 | 3/1952 | Breyfogle et al. | 277/95 UX |
| 3,076,631 | 2/1963 | Grove | 277/206 X |
| 3,232,641 | 2/1966 | Perry | 277/95 |
| 3,336,086 | 8/1967 | Reinsma | 277/95 X |
| 3,372,941 | 3/1968 | Liebig | 277/178 |

*Primary Examiner*—Samuel B. Rothberg
*Attorney*—Fryer, Tjensvold, Feix, Phillips & Lempio

[57] ABSTRACT

A seal between two relatively rotatable flat surfaces one of which has an annular groove, there being an annular resilient seal element in the groove having a part in contact with the other flat surface, the seal element having a more or less V-shaped cross section with two legs designed to be brought together upon being placed in the groove to produce a tubular resilient member to insure a light faceload at the area of sealing and a relatively constant spring rate.

6 Claims, 4 Drawing Figures

INVENTORS
MITCHELL MCMURRAY
EUGENE A. PLOUZEK
JAMES R. STURGES

BY
ATTORNEYS

CONSTANT PRESSURE SEAL

This Application is a continuation of Application Ser. No. 738,519 filed June 20, 1968, and now abandoned.

Seals for use in the same environment as that of the present invention are disclosed in our assignee's U.S. Pats. to Harold L. Reinsma, Nos. 3,336,086 and No. 3,390,922, both entitled "Track Pin Seal." The title, however, should not be taken as limiting the environment in which the seals are useful, as the seals of these two patents as well as that of the present application are proving useful for many purposes and in many different environments.

It is an object of the present invention to provide a resilient seal element and a method of making the same in which the element has a high degree of resiliency with a relatively constant spring rate for urging a sealing area into contact with a movable surface. A further object is to employ a method of manufacture by which an open V-shaped seal upon being placed in a seal groove will be closed to form a tube-like elastic spring and will be securely held against slipping in the groove.

Other objects and advantages of the invention are best understood by reading the following specification wherein reference is made to the accompanying drawings illustrating preferred embodiments of the invention.

Figure 1:
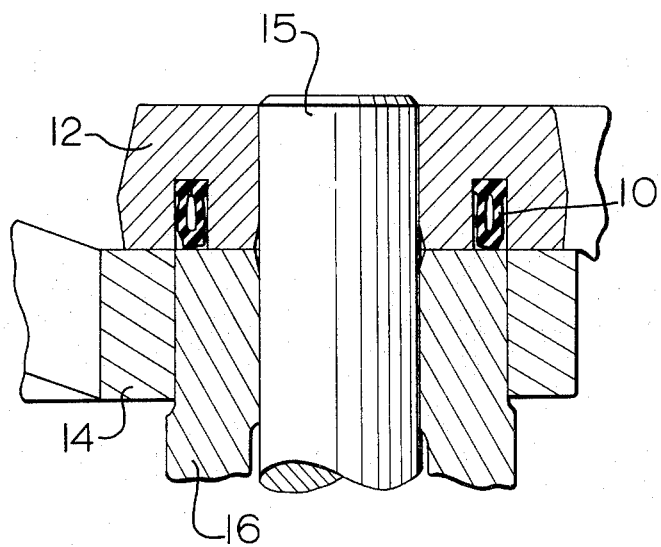
FIG. 1 is a central sectional view through the hinged connection of a pair of track links such as used on track type tractors.

In FIG. 1 of the drawings, a seal constructed in accordance with the present invention is shown at 10 as used at the hinged connection between two links of a tractor track. The end of one of the links is shown at 12 and the other at 14. A track pin 15 has a press fit in the link 12 and a track bushing 16 has a press fit in the link 14. The fit between the pin and bushing is such as to permit relative angular movement of the pin and bushing as well as the track links. The seal 10 is disposed in a suitable annular groove in the link 12 and bears against the end of the bushing 16 to provide a seal against entry of foreign matter toward the bearing surfaces of the pin and bushing as well as to prevent the escape of lubricant therefrom.

Figure 2:
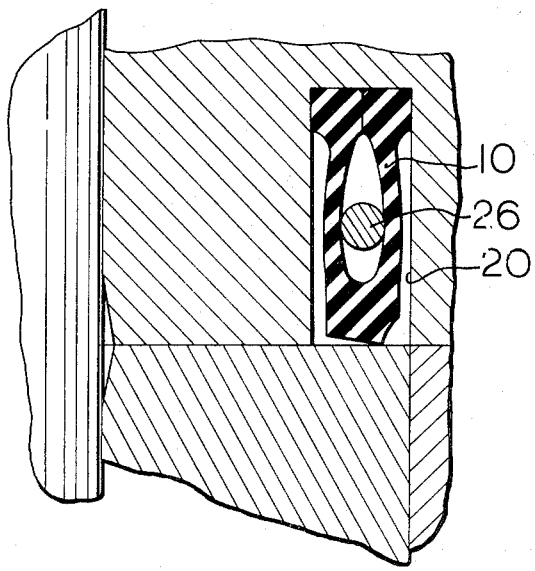
FIG. 2 is an enlarged fragmentary view showing a part of the right side of FIG. 1 and illustrating an additional member which may be used with the seal element shown.
Figure 3:
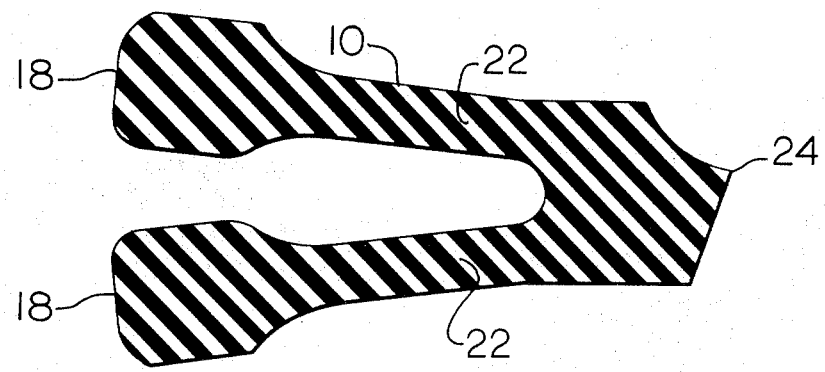
FIGS. 3 and 4 are enlarged views in cross-section of the seal element of the present invention before it is assembled into its operative position and they illustrate two modifications to the invention.
Figure 4:
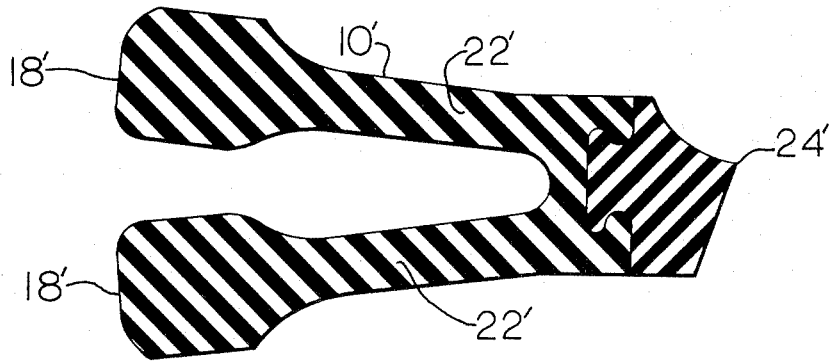

The same seal 10 is shown enlarged in FIG. 2 and further enlargements of the seal are shown at 10 in FIG. 3 and 10' in FIG. 4. The method of making the seal is illustrated in FIGS. 3 and 4 wherein the seal is shown as having been molded in a V-shape with enlarged portions 18 in FIG. 3 and 18' in FIG. 4 which, when the seal is inserted in the slot best shown at 20 in FIG. 2, are brought together to form what is in effect a tube. The side walls of the tube formed of the two legs of the V as shown at 22 in FIG. 3 are not as thick as the other parts and are readily flexible when the seal is in use.

For example, the thick apex portion is not as flexible as the thin side walls and thus provides a relatively stable distortion free support of the sealing face.

At the apex of the V, an extremely narrow sealing area is provided at 24 and when the seal is inserted in the slot, enlarged ends 18 are forced together or compressed to an extent that will prevent their rotation within the groove relative to the link 12.

Also, the size of the seal is such that when it is placed in the slot 20, sealing surface or apex 24 will project beyond the open end of the slot a short distance so that, upon assembly of the link 12 into position against the end of the bushing 16, the seal will be compressed and the legs 22 thereof will flex outwardly providing resilient means or springs which urge the sealing surface into engagement with the end of the bushing with any desired force determined by the resiliency of the material of which the ring is made and the thickness of the leg sections 22.

Thus, in order to be effective in maintaining a seal, a seal must be designed to deflect sufficiently to maintain sealing contact during relative movement between the moveable members as a result of design clearance and/or wear. This deflection which every seal must be designed to accomodate may be termed the normal deflection range of the seal.

One of the advantages of the seal resides in the fact that, as well as producing a light seal pressure, the spring rate is relatively constant and in the event of wear between the parts permitting them to move with respect to each other, the spring pressure which maintains the sealing effect varies very little.

Because of the manner in which the seal is constructed, there may in some cases by a tendency for the leg sections 22 to collapse inwardly when the seal is inserted in the groove rather than to bow outwardly as intended. Should this occur, a torus shown at 26 in FIG. 2 may be inserted between the legs of the seal element before it is placed in the groove, thus preventing the legs from collapsing inwardly when they are compressed by the bushing and the link 12 being brought together. The torus may be of metal or an elastomer such as rubber.

A modified form of the invention is shown in FIG. 4 wherein the cross section of the seal shows it to be made of two parts. In this modification, the apex of the V-shaped seal member is formed of a harder material which may be a plastic or any material capable of withstanding more wear than the elastomer of the body of the seal member. The two parts are preferably joined by an interlocking configuration as shown.

What is claimed is:

1. A seal between two flat relatively rotatable abutting surfaces having concentric bores which define an area to be sealed against loss of lubricant and entry of foreign matter, one of said faces having an axially extending groove spaced from and concentric to the bore, said groove defining a closed end and an open end, seal means in said groove comprising a resilient ring distorted to be contained entirely within the groove and to provide sealing pressure to a sealing end area in contact with the other of said abutting surfaces, said ring having a generally V-shaped contour in cross-section with the legs thereof terminating at their apex in an extremely thickened portion, said thickened portion having an extremely narrow sealing end area on the outer surface thereof in contact with said other of said abutting surfaces, the free ends of each of the legs terminating in a thickened portion which when brought together are wider than the bottom of said groove whereby the same prevent rotation of the ring after insertion in the groove, said legs being long, thin and resilient and of a length which is greater than the width of the seal section at said legs whereby the same will bow outwardly and provide a constant sealing force on the seal end area over a wide range of deflection when the ring is disposed in said groove.

2. The seal of claim 1 further including an annular spring element positioned between and engaging only the legs to ensure that the legs remain bowed.

3. A seal for sealing an area between a pair of relatively rotatable members, said seal comprising;
   an annular resilient ring having a substantially V shape in cross-section formed by resilient side walls joined at one end to form an apex and said side walls each having a free end, and a sealing face carried at the outside of the apex thereof;
   the free end of said side walls terminating in enlarged portions to be press fit into an annular groove formed in one of said rotatable members;
   said apex being thicker than said side walls to provide stable distortion free support of said sealing face in sealing contact with the other of said rotatable members;
   resilient means comprising said side walls of said seal being formed to flex outwardly to provide a constant biasing force over the normal deflection range of said seal for urging said sealing face into contact with the other of said rotatable members, said seal being formed so that said resilient means is spaced away from and independent of said sealing face.

4. The seal of claim 3 further comprising a spacer element positioned between said side walls to prevent said walls from bowing inwardly.

5. The seal of claim 4 wherein said spacer element is positioned for line contact with said side walls.

6. The seal of claim 3 wherein said sealing face comprises a sharp edge for line contact with the other of said rotatable members.

* * * * *